United States Patent

[11] 3,599,498

[72] Inventor Angelo J. Misenti
  Simsbury, Conn.
[21] Appl. No. 816,193
[22] Filed Apr. 15, 1969
[45] Patented Aug. 17, 1971
[73] Assignee Combustion Engineering, Inc.
  Windsor, Conn.

[54] CONTROL ROD DRIVE MECHANISM
  3 Claims, 3 Drawing Figs.
[52] U.S. Cl. .................................................... 74/25
[51] Int. Cl. .................................................... F16h 21/16
[50] Field of Search ........................................... 74/25

[56] References Cited
  UNITED STATES PATENTS
  2,152,518   3/1939   Wolff ............................. 74/25
  2,996,928   8/1961   Watson .......................... 74/25
  3,394,599   7/1968   Tucker .......................... 74/25

*Primary Examiner*—M. Cary Nelson
*Assistant Examiner*—Wesley S. Ratliff, Jr.
*Attorneys*—Carlton F. Bryant, Eldon H. Luther, Robert L. Olson, John F. Carney, Richard H. Berneike, Edward L. Kochey, Jr. and Lawrence P. Kessler

ABSTRACT: In a nuclear reactor a cylindrical control rod extension is surrounded by a cylindrical form which contains three rollers. This cylindrical form is rotatably mounted within a surrounding pressure vessel and includes a rotor. A stator winding surrounding the pressure vessel effects rotation of the cylindrical form. The rollers are in pressure contact with the control rod extension and at a slight angle so that rotation of the cylindrical form effects longitudinal movement of the control rod. Operation of an electrical coil moves a magnetic arm releasing one of the rollers effecting scram of the reactor control rod.

INVENTOR
ANGELO J. MISENTI

By E L Kochey
ATTORNEY

PATENTED AUG 17 1971

INVENTOR
ANGELO J MISENTI

BY E.L. Kochey

ATTORNEY

CONTROL ROD DRIVE MECHANISM

BACKGROUND OF THE INVENTION

This invention relates to nuclear reactors and in particular to an apparatus for driving control rods in both the modulating and scram modes.

Control rods are generally used in nuclear reactors for controlling the output thereof. These rods must be finely adjusted for changes in output and for maintaining the output constant. In the event that the reactor must be rapidly shutdown these control rods must also be capable of scramming which requires that they be fully inserted into the reactor core as rapidly as possible.

These control rods must be driven by power from some source outside the reactor since the control rods are within the reactor core and therefore within the pressure vessel, the driving force must in some way be transmitted through the walls of the pressure vessel by using seals or some drive which permits a hermetic seal.

Since electrical motors which are most readily available are high speed devices and the control rod must be driven at relatively low speed to obtain control, substantial gear reduction is required. A large number of control rod drives are used within a single-reactor core. These are relatively close to one another creating space problems particularly where large noncylindrical forms are used.

My invention contemplates a control rod drive for a nuclear reactor wherein the control rod has a cylindrical control rod extension. A rotatable cylindrical form surrounds a portion of this control rod extension. Mounted on the cylindrical form are a plurality of rollers which are in pressure contact with the cylindrical extension but have their axis forming a slight angle with that of the control rod extension. This cylindrical form containing the rollers is supported at a fixed elevation and rotated when controlled longitudinal movement of the control rod is desired. Means are provided to prevent rotation of the control rod extension so that movement of the roller around the control rod effects longitudinal movement thereof. One or more of these rollers may be mounted on a pivoted portion of the cylindrical form so that the pressure from this roller may be released as desired. This permits the control rod to drop under the influence of gravity thereby effecting scram of the nuclear reactor.

Since the rotor on the cylindrical form may interact with an electrical field formed by windings outside of a surrounding pressure vessel, a hermetic seal is effected thereby avoiding any leakage problems. Since the apparatus of my invention produces simple symmetrical pressure tubes surrounding each of the control rod extensions, arrangement within the reactor vessel is simplified.

A substantial speed reduction is obtained along with the concomitant increase in force with this reduction being selected by establishment of the angle difference of the axis of the roller and the axis of the control rod extension.

The control rod in my invention may be easily scrammed by the simple action of releasing one of the rollers. In the event of a failure of the drive mechanism due to loss of friction, the reactor will fail safe since the control rods will drop into the reactor.

DESCRIPTION OF THE PREFERRED EMBODIMENT

Figure 1:
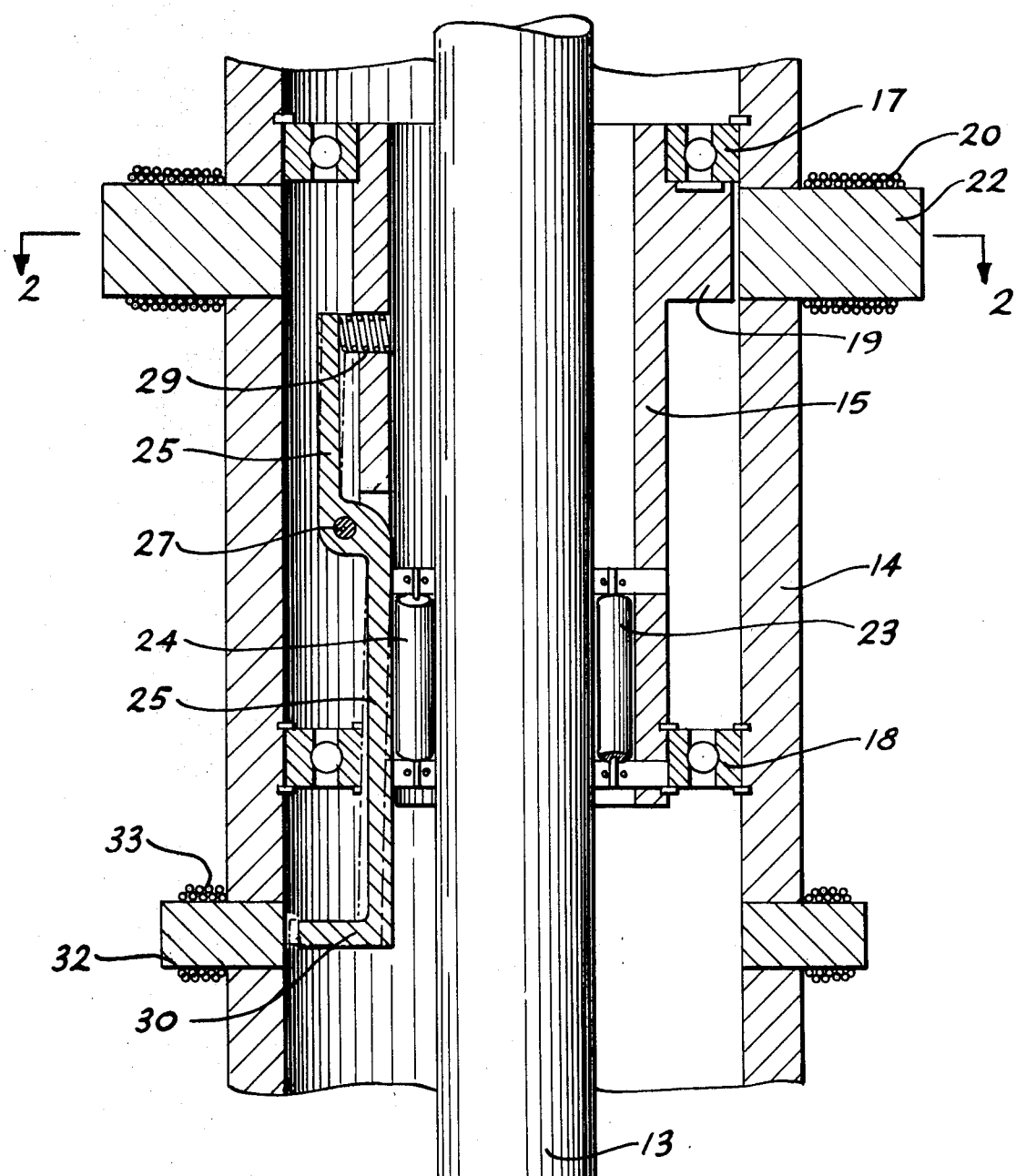
FIG. 1 is a section side elevation showing a portion of the control rod and its extension and the driving mechanism of my invention.
Figure 2:
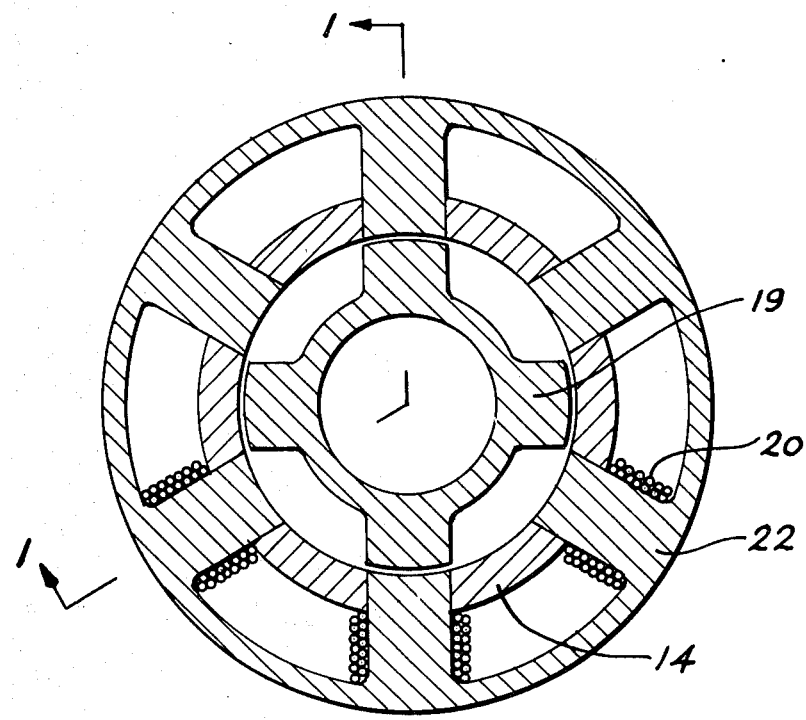
FIG. 2 is a sectional plan view through FIG. 1.
Figure 3:
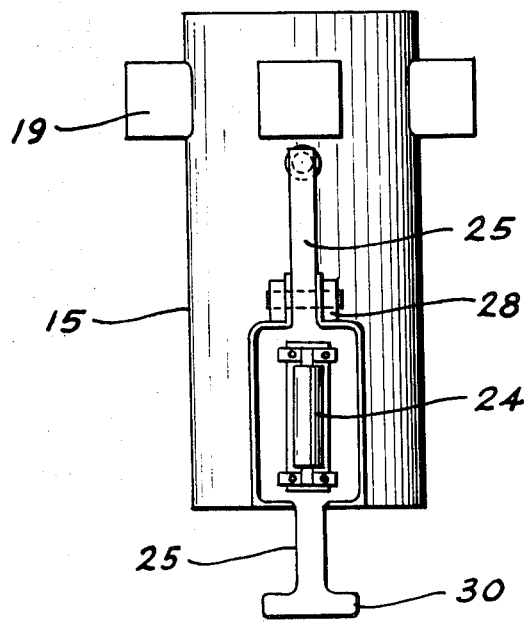
FIG. 3 is a detailed view from the left side of FIG. 1 illustrating the arrangement of the movable roller.

The control rod 12 is positioned within the core of a nuclear reactor. This control rod is of the cruciform shape and fits between the fuel bundles 16. The structure of the fuel bundles and their support inherently prevents rotation of this control rod. Control rod extension 13 is joined to the control rod in such a manner to prevent rotation between the control rod extension and the control rod so that rotation of the control rod extension itself is also prevented. The entire control rod extension is surrounded by a pressure vessel 12 which is closed at the upper end and joins the full pressure section of the reactor core at its lower end. Full pressure as existing within the reactor core exists inside this pressure vessel while no pressure exists outside the pressure vessel. A cylindrical form 15 is mounted within the pressure vessel being supported at the upper end on ball bearings 17 and supported by the lower end by ball bearings 18. This permits rotation of the cylindrical form while preventing vertical movement of the form.

The cylindrical form 15 includes a rotor portion 19 which is located in close proximity to the pressure vessel. Drive coils 20 along with armatures 22 are located on the pressure vessel so that a rotating magnetic field may be set up in the area of the rotor. By alternatively energizing the various coils, rotation of the rotor at any desired speed may be effected.

The cylindrical form 15 has mounted thereon two fixed rollers 23 and one releasable roller 24. These rollers are in pressure contact with the control rod extension and are arranged so that their axes are in a plane parallel to the control rod extension but at an angle of one degree from axis of the control rod extension. Rotation of the cylindrical form with the coils contained in this position exerts a force on the shaft moving it upwardly or downwardly depending on the direction of rotation of the cylindrical form.

The removable roller 24 is located on lever member 25. This member is pivoted on fulcrum 27 which is pinned through lugs 28. A spring 29 presses the upper portion of the lever outwardly thereby exerting a force inwardly in the lower portion of the lever. The roller 24 is thereby pressed inwardly against the control rod extension. A generally equal force against the control rod extension is thereby effected by each of the rollers 23 as well as roller 24. This spring force must be sufficiently high to provide sufficient friction to carry the weight of the control rod.

The lever is further extended downwardly below the roller 24 with a magnetic arm 30 formed on the lower end. A release ring magnet 32 having electrical coil 33 surrounds the pressure vessel. Regardless of the position of the cylindrical form 15, energizing coil 33 draws the magnetic arm 30 outwardly toward the armature 32. This operates against the force of spring 29 withdrawing roller 24 from contact with the control rod extension. Scram of the control rod is thereby effected by energizing this coil 33 since all forces supporting the control rod are removed and the control rod falls of its own weight into the reactor core. The released position of the lever 25 is shown by the dotted line in FIG. 1.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A control rod drive for a nuclear reactor having a control rod and a cylindrical control rod extension comprising: means for preventing rotation of said control rod extension; a rotatable cylindrical form surrounding a portion of said control rod extension, said cylindrical form having a plurality of rollers mounted thereon and in pressure contact with said control rod extension, the axis of said rollers being slightly askew of the axis of said control rod extension but in a plane parallel to said control rod extension; means for supporting said cylindrical form at a fixed location; a pressure vessel closely surrounding said cylindrical form; and means for rotating said cylindrical form comprising a magnetic rotor forming a portion of said cylindrical form, and electrical winding means around said pressure vessel for establishing rotating magnetic field in the area of said rotor, whereby longitudinal movement of said control rod extension is effected.

2. A control rod drive for a nuclear reactor having a control rod and a cylindrical control rod extension comprising: means for preventing rotation of said control rod extension; a rotatable cylindrical form surrounding a portion of said control rod extension, said cylindrical form having a plurality of rollers mounted thereon and in pressure contact with said control rod extension, the axis of said rollers being slightly askew of the axis of said control rod extension but in a plane parallel to said control rod extension; means for supporting said cylindrical form at a fixed location; means for rotating said cylindrical form whereby longitudinal movement of said control rod extension is effected; a pressure vessel closely surrounding said cylindrical form; a pivoted lever member forming a portion of said cylindrical form, one of said rollers removable from pressure contact and mounted on said lever member; said lever member being spring biased to maintain the roller contained therein in pressure contact with said control rod extension; a magnetic arm forming a portion of said lever member; and an electrical winding surrounding said pressure vessel at a location such that the electrical field acts on the magnetic arm to withdraw said roller from pressure contact.

3. An apparatus as in claim 2 wherein said means for rotating said cylindrical form comprises: a magnetic rotor forming a portion of said cylindrical form, and electrical winding means around said pressure vessel for establishing rotating magnetic field in the area of said rotor.